LEGEND: ○ SULPHUR TREATMENT AT 475°C IN ACCORDANCE WITH INVENTION.

☐ CALCINED AT 825°C.

△ UNTREATED Cu CONCENTRATE.

Inventors
ANDREW I. VIZSOLYI
ANNA M. ARMSTRONG
FRANK A. FORWARD
by: *signature* Agent United States Patent Office 3,459,535
Patented Aug. 5, 1969

3,459,535
TREATMENT OF COPPER BEARING COMPLEX SULPHIDES
Andrew I. Vizsolyi and Anna M. Armstrong, Vancouver, British Columbia, and Frank A. Forward, Ottawa, Ontario, Canada, assignors to Sherritt Gordon Mines Limited, Toronto, Ontario, Canada, a company of Canada
Filed Mar. 7, 1966, Ser. No. 532,444
Int. Cl. C22b 1/02, 15/08
U.S. Cl. 75—1          8 Claims

ABSTRACT OF THE DISCLOSURE

The method for pretreating complex copper-iron-sulphur mineral sulphides to improve their responsiveness to acid oxidation leaching. The complex sulphides are heated at a temperature within the range of 300° C. to 600° C. in contact with elemental sulphur for a time sufficient for at least a portion of the elemental sulphur to be taken up by the complex sulphides with concurrent formation of simple copper sulphides and iron sulphides.

Figure 1:
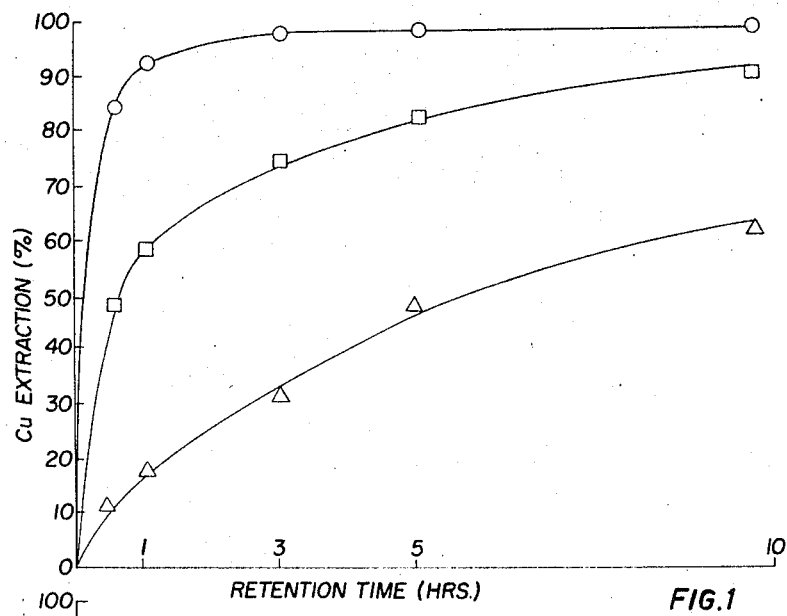

This invention relates to a method for the treatment of complex copper bearing sulphides to improve their responsiveness to aqueous oxidation leaching for extraction of copper values. More particularly, it relates to a method for sulphidizing complex sulphides containing iron and copper in combined form whereby the complex is broken down into a plurality of simple metal sulphides from which the copper values may be readily extracted by aqueous acid oxidation leaching.

Copper is often present in ores in the form of complex mineral sulphides composed of copper, sulphur and iron combined in varying proportions, for example, as chalcopyrite ($CuFeS_2$) and bornite ($Cu_3FeS_2$). One hydrometallurgical approach used to extract the copper values from such minerals involves leaching them under oxidizing conditions at elevated temperatures, below the boiling point of sulphur, in an aqueous acid solution to oxidize sulphide sulphur to elemental sulphur and solubilize the copper as sulphates. The dissolved copper may be recovered from the leach solution and the elemental sulphur from the residue by techniques well known in the art.

The known processes of acid leaching ores or concentrates containing such complex minerals to recover copper values suffer from several disadvantages which adversely affect their capital and operating economics. Firstly, such processes generally require prolonged leaching periods to produce acceptable copper extractions. For example, to extract about 85% of the copper from a typical chalcopyrite concentrate by leaching in a sulphuric acid solution at about 90° C. and under about 50 p.s.i. oxygen pressure, about 12 hours is required. Such extended retention times naturally reflect unfavourably on the overall economics of this method as a means of recovering copper from complex copper-iron sulphides. Another disadvantages of these methods, particularly when applied to chalcopyrite, is that regardless of leaching conditions or retention times, total copper recovery is generally less than 85%. There is, therefore, substantial room for improvement of the degree of extraction as well as of retention time in these processes.

Another problem is that the iron present in the mineral is solubilized in substantial quantities together with the nonferrous values. The major portion of this iron hydrolyzes under the acidic conditions of the system and precipitates as a very finely divided iron hydroxide. This iron precipitate is hard to filter and difficulties are experienced in separating the iron-containing residue from the copper-containing solution at the end of the leaching stage.

One of the objects of this invention, therefore, is to provide a method for treating complex sulphides containing copper and iron in combined form whereby desired copper values can be rapidly and effectively extracted by leaching with an aqueous acid solution under oxidizing conditions at relatively low temperatures. Another object is to provide a method of treating such complex sulphides whereby the solubility of the iron content thereof in an acid leach solution under oxidizing conditions is substantially reduced.

A more specific object of the invention is to provide a method of pre-treating chalcopyrite, bornite and the like copper-iron sulphide complexes to render them more amenable to treatment by low temperature aqueous acid oxidation for the recovery of the copper values contained therein.

Other objects and advantages of the invention will become apparent from the following detailed description.

Figure 2:
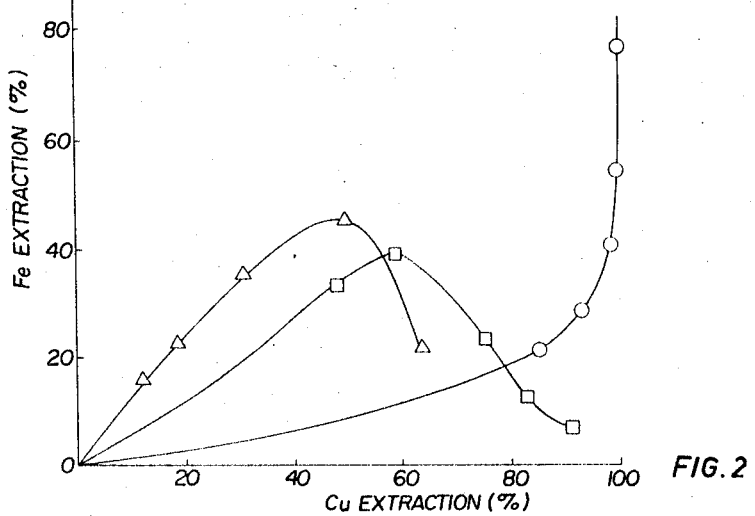

In the drawings, FIGURES 1 and 2 show the results of Examples 1, 2 and 3 in graphical form.

The method by which the objects of this invention are achieved is based on the discovery that certain copper and iron containing complex mineral sulphides when heated within a critical temperature range in contact with elemental sulphur will take up sulphur and change their mineralogical structures to a form in which the copper is more amenable and the iron is less amenable to extraction by acid oxidation leaching than they are in their original complex form.

The method of the invention, therefore, comprises heating a complex mineral containing copper, iron and sulphur in combined form at a temperature within the range of 300° C. to 600° C. in a reaction zone in contact with elemental sulphur for a period of time sufficient for at least a portion of the elemental sulphur to be taken up by the complex sulphide and preferably until the take up of sulphur has substantially ceased.

Treatment of the complex sulphide in accordance with this procedure, it is believed, results in the conversion of the complex sulphide to a plurality of simple sulphides. The newly formed copper sulphides are readily dissolved in an aqueous acid solution under oxidizing conditions, even at relatively low temperatures in the order of 85–95° C. The iron, on the other hand, in its modified compound form has a very slow leaching rate in comparison to the copper. As a result, copper can be preferentially extracted by aqueous acid oxidation leaching and an effective separation of the bulk of the iron therefrom can be obtained. The residue containing the iron compound and other insoluble constituents is easily separable from the solution by filtration, as only a small portion of the iron will be in the form of finely divided hydrxide.

The method of this invention is applicable to either high or low grade material containing complex copper-iron sulphides. However, the starting material normally will be a high grade sulphide concentrate obtained by selective froth flotation of a copper bearing sulphide ore. These concentrates will often contain other non-ferrous metals in addition to copper. For example, a chalcopyrite concentrate may include some zinc, nickel and/or cobalt, etc. It is to be understood, therefore, that by the use of the terms "complex sulphide," "concentrate" or "sulphide concentrate" herein it is intended to include such materials and it is also intended to include any other high or low grade materials which contain iron and economically recoverable quantities of copper in complex sulphide form.

In carrying out the invention, the first step involves pulverizing the complex sulphide starting material in accordance with conventional methods. Preferably it should be comminuted to substantially 100% minus 150 mesh Tyler standard screen.

Following pulverization, the concentrate is mixed with finely divided sulphur.

The sulphur can be provided as common elemental sulphur or as a sulphur containing compound which, at the temperature of the subsequent heating step, will react or decompose to provide elemental sulphur within the reaction zone. To provide a large reactive surface area, the sulphur preferably should be in a finely divided condition. Sulphur particles capable of passing through a 150 mesh Tyler screen are preferable for the purposes of this invention.

Generally, the amount of sulphur provided in the heating step will be in the range of 5–20% by weight. The precise amount of sulphur required in any case is variable depending on the type of complex sulphide subjected to treatment and the temperature at which the heating step is conducted. Since there is an uptake of sulphur in the heating step which results in the conversion of the complex mineral to different simple minerals, the optimum amount of sulphur in any case will be the stoichiometric amount required to form the simple sulphides from the complex sulphide. Because the type of simple sulphide formed will depend in some cases on the temperature, the optimum sulphur requirements for conversion to simple sulphides may be different for different temperatures. For example, in the case of the mineral chalcopyrite, it is believed that the reaction which takes place in the heating step may be expressed as follows:

$$CuFeS_2 + S \rightarrow CuS + FeS_2 \qquad (1)$$

However, in the temperature range of the heating step (300–600° C.) the decomposition of these products must be considered as well:

$$2CuS \rightleftharpoons Cu_2S + S \qquad (2)$$

and $$FeS_2 \rightleftharpoons FeS + S \qquad (3)$$

Thus, the final composition of the products and the optimum sulphur requirements will depend on the relative rates of the three reactions as well as the rate of vaporization of elemental sulphur. Equations 2 and 3 indicate that these reactions result in the regeneration of free sulphur. The "sulphur regeneration" reactions are in a state of equilibrium—only a portion of each of the sulphidization products of Equation 1 is broken down further in accordance with Equations 2 and 3. At the preferred temperatures for carrying out the heating step, the amount of free sulphur which must be provided to the system to obtain complete sulphidization will be as low as one-half the stoichiometric amount required to satisfy Equation 1 because of the regeneration of free sulphur in accordance with Equations 2 and 3. When the heating step is carried out in the preferred range, the effect of Equations 2 and 3 is maximized. Having regard to these factors, the preferred range of the amount of sulphur addition for the treatment of chalcopyrite is between 50% and 100% of the stoichiometric requirements of Equation 1. Lesser amounts of sulphur will be beneficial to whatever extent single metal sulphides are formed by the uptake of what is available. Sulphur in excess of the stoichiometric requirement merely remains in the mixture at the end of the heating step in uncombined form. Similar condsiderations apply in the treatment of other complex copper sulphides such as bornite.

The temperature at which the sulphidizing step is conducted is important. The range of permissible temperatures will depend on the precise nature of the complex sulphide subjected to treatment but in most cases will be within the broad range of 300–600° C. In the case of chalcopyrite, for example, the sulphidization is carried out at temperatures within the range of 375° C. to 575° C., preferably 450–500° C. At temperatures below 375° C. very little sulphidization occurs or the rate of the reaction is too slow for practical purposes.

When chalcopyrite is treated at a temperature greater than 575° C., copper extraction and the leaching rate under acid oxidizing conditions quickly deteriorate. The equilibrium of the sulphidization reaction, represented by Equation 1 is shifted to the left and chalcopyrite is reformed.

The treated sulphides discharged from the sulphidizing step can be readily leached by conventional low temperature aqueous acid oxidation techniques. According to these processes the sulphides are dispersed in an aqueous sulphuric acid solution containing at least the stoichiometric amount of acid required to combine with the non-ferrous metals as sulphates and the resulting solution is agitated and reacted with oxygen at a temperature in the range of about 85–119° C. Higher oxidation temperatures, e.g., up to 150° C., may be employed but special procedures must be adopted to avoid problems resulting from the occulsion of unleached sulphides by the molten sulphur globules which are formed at these temperatures.

In the treatment of sulphidized material of this invention by these known processes, the material can first be ground lightly to reduce any lumps or agglomerates formed in the heating step or it may be passed directly to the leaching step. During leaching the copper is rapidly and preferentially oxidized and dissolved in the leach solution as sulphates with concurrent formation of elemental sulphur.

The iron content of the pretreated sulphides remains substantially unattacked until the bulk of the copper has been extracted. This unleached iron is easily separable from the leach solution by filtration. On the other hand, it is notable that on acid leaching copper-iron sulphides which have not been pretreated in accordance with the invention under the same conditions, initially iron is solubilized at a rate roughly equal to that of the non-copper present in the mineral and as the available acid is consumed by the copper and iron, dissolved iron begins to hydrolyze. The hydrolyzed iron precipitates in a very fine form and as such causes serious difficulties in separating the leach solution from the residue by filtration. Of course, even with the pretreated material some iron will be solubilized in any event and as the leaching is continued beyond the point where about 95% of the copper has been extracted, the rate of iron extraction will increase. Selective removal of small amounts of dissolved iron from a solution containing dissolved copper is a relatively simple, known process in hydrometallurgy, although it may be desired in some cases to cut the leach period short to reduce the amount of iron contamination. Upon completion of the leaching step and separation of the undissolved residue, copper and any other non-ferrous metals which may have been dissolved from the starting material are recovered from the leach solution and, where it is economically feasible, elemental sulphur is recovered from the residue by methods known in the art.

The invention is further described and illustrated in the following examples:

Example I

The material used for these tests was a chalcopyrite flotation concentrate that analyzed (percent): Cu, 30.2; Fe, 31.4; S, 35.5; Insol., 3.0; $H_2O$, Tr. 685 grams of this concentrate were thoroughly mixed with about 10% by weight elemental sulphur. The mixture was placed in a retort and heated at 475° C. for 2 hours. During this treatment there was an 8% uptake in sulphur and an apparent change in mineral structure. The original yellow-green colour changed to bluish-black—resembling covellite and chalcocite. The composition of the product from this step was: Cu, 28.3; Fe, 29.5; $S_t$, 40.0; S°, 0.2; $S_{SO_4}$, nil; Insol., 1.8. This product was ground in a ceramic pebble mill to substantially 100% minus 325 mesh Tyler screen.

730 grams of the ground, sulphur-treated product were slurried in 3.5 litres of solution containing 191 ml. $H_2SO_4$ (equivalent of 1 mole of acid per mole of copper). The resulting slurry (17% pulp density) was placed in a low-pressure 1 gallon autoclave and heated with agitation to 90° C. under 70 p.s.i. oxygen pressure. Samples were taken at ½, 1, 3, 5 and 10 hour intervals. The results are shown in Table I.

TABLE I

| Retention time, hrs.: | Extraction, percent | | Distribution of S, percent [1] | | |
|---|---|---|---|---|---|
| | Cu | Fe | S⁻ | S° | $SO_4^-$ |
| ½ | 84 | 21 | 74 | 24 | 2 |
| 1 | 93 | 27.5 | 66 | 28 | 6 |
| 3 | 97.5 | 40 | 53 | 30 | 17 |
| 5 | 98.5 | 53 | 40 | 35 | 25 |
| 10 | 99.5 | 76 | 22 | 39 | 39 |

[1] Does not include S added as $H_2SO_4$.

Example II

For purposes of comparison, an untreated 675 g. sample of the same concentrate as described in Example 1 was ground to 100% minus 325 mesh and leached under the same conditions as employed in Example I. The results are shown in Table II.

TABLE II

| Retention time, hrs.: | Extraction, percent | | Distribution of S, percent | | |
|---|---|---|---|---|---|
| | Cu | Fe | S⁻ | S° | $SO_4$ |
| ½ | 11.5 | 16.5 | 75 | 25 | |
| 1 | 18.0 | 23.0 | 74 | 26 | |
| 3 | 30.5 | 35.0 | 64 | 36 | |
| 5 | 49.5 | 45.0 | 56 | 44 | |
| 10 | 62.0 | 21.0 | 46 | 54 | |

Example III

For further comparison, 645 grams of the concentrate of Example I were roasted in an open retort at 825° C. for 2 hours. This treatment resulted in a 6% loss of sulphur and an apparent change in mineral structure evidenced by a change in colour from green to black and the immediate evolution of $H_2S$ on contact with acid. The product analyzed (percent): Cu 31.8; Fe 33.2; $S_t$ 31.9 and Insol. 3.1. This calcine was ground in a ceramic pebble mill to 100% minus 325 mesh. 635 grams of the concentrate were acid leached under the conditions described in Example I. The results are shown in Table III.

TABLE III

| Retention time, hrs.: | Extraction, percent | | Distribution of S, percent | | |
|---|---|---|---|---|---|
| | Cu | Fe | S⁻ | S° | $SO_4^-$ |
| ½ | 48 | 35.5 | 75 | 25 | |
| 1 | 58.5 | 39.5 | 62 | 38 | |
| 3 | 75.5 | 22.0 | 28 | 72 | |
| 5 | 83.0 | 12.5 | 70 | 80 | |
| 10 | 91.5 | 6.0 | 9 | 91 | |

The results of Examples I, II and III are shown graphically in FIGURES 1 and 2 of the accompanying drawing. It can be observed that the concentrate treated with sulphur in accordance with this invention behaves entirely different from either the untreated or the calcine material. In general, the sulphur treated concentrate responds to the acid leach in the following manner:

(a) Copper starts to dissolve immediately;
(b) iron dissolution is initially slow and increases with
(c) the production of acid.

On the other hand, untreated or calcined concentrate behaves as follows:

(a) Copper and iron dissolve simultaneously;
(b) iron slowly hydrolyzes from solution;
(c) acid is not generated but consumed.

By the sulphur pretreatment of the concentrate, satisfactory extraction of copper (~98%) can be achieved in 3 hours, which cannot be duplicated in the treatment of untreated or calcined material. As an indication of the relative rates, it can be observed that identical copper extractions (62%) are achieved in 10 hours, for the untreated concentrate, ~1 hour for pre-calcined concentrate, and ~15 minutes for sulphur treated concentrate.

Example IV

The procedures of Examples I, II and III were repeated except that the starting material was bornite ($Cu_5FeS_4$) which analyzed (percent): Cu 50.6; Fe 9.2; S 22.1; Insol. 6.2.

The results are shown in Table IV.

TABLE IV

| | I | | II | | III | |
|---|---|---|---|---|---|---|
| | Sulphidized bornite extraction, percent [1] | | Untreated bornite extraction, percent | | Calcined bornite extraction, percent | |
| Retention time, hrs. | Cu | Fe | Cu | Fe | Cu | Fe |
| 1 | 67 | 38 | 61 | 48 | 62 | 38 |
| 3 | 83 | 27 | 74 | 15 | 74.5 | 16 |
| 5 | 92 | 15 | 83 | 8 | 82 | 9.0 |
| 9 | 99 | 14 | 89 | 8 | 90 | 7.5 |

[1] The sulphidized bornite analyzed percent:
Cu, 48.6; Fe, 8.5; S, 23.9; Insol., 6.0.

The improved results obtainable by the application of the invention to bornite are readily observable from the results in Table IV.

It will be understood, of course, that modifications can be made in the preferred embodiment of the present invention as described hereinabove without departnig from the scope and purview of the appended claims.

What we claim as new and desire to protect by Letters Patent of the United States is:

1. The method of treating copper and iron containing sulphides in which the copper and iron are combined with sulphur as a complex to improve the responsiveness of said sulphides to treatment by aqueous acid oxidation leaching for extraction of copper values which comprises heating said sulphides within the temperatnre range of 300° C. to 600° C. in contact with elemental sulphur for a period of time sufficient for at least a portion of the elemental sulphur to be taken up by the sulphides.

2. The method according to claim 1 in which the heating is continued until the uptake of sulphur has substantially ceased.

3. The method according to claim 1 in which the heating is conducted at a temperature within the range of 450° C. to 500° C.

4. The method according to claim 1 wherein the copper and iron containing complex is chalcopyrite.

5. The method according to claim 1 wherein the copper and iron containing complex is bornite.

6. In the process of treating mineral sulphide material containing chalcopyrite in which said material in finely divided form is leached at a temperature below about 150° C. in an aqueous sulphuric acid solution under oxidizing conditions to extract copper therefrom, the improved method for increasing the responsiveness of said material to said treatment which comprises heating said material within the temperature range of 375° C. to 575° C. in contact with elemental sulphur for a period of time sufficient for at least a portion of the elemental sulphur to be taken up by the material.

7. The method according to claim 6 wherein from about 0.5 to 1.0 mole of sulphur is provided in said heating step for each mole of chalcopyrite to be treated.

8. The method according to claim 7 wherein the heating temperature is 475° C.

References Cited

UNITED STATES PATENTS

| | | | |
|---|---|---|---|
| 1,548,279 | 8/1925 | Pike | 23—135 |
| 2,197,185 | 4/1940 | Kissock | 75—116 |
| 3,241,950 | 3/1966 | Mackiw et al. | 75—117 |
| 3,174,849 | 3/1965 | Mackiw et al. | 75—115 |
| 2,746,859 | 5/1956 | McGauley et al. | 75—115 |
| 2,568,963 | 9/1951 | McGauley et al. | 75—117 |
| 1,226,190 | 5/1917 | Cox et al. | 75—117 |

L. DEWAYNE RUTLEDGE, Primary Examiner

T. R. FRYE, Assistant Examiner

U.S. Cl. X.R.

23—55; 75—115, 101, 21